(12) United States Patent
Jurgens et al.

(10) Patent No.: US 9,749,406 B1
(45) Date of Patent: Aug. 29, 2017

(54) SYSTEM AND METHODS FOR AUTOMATED COMMUNITY DISCOVERY IN NETWORKS WITH MULTIPLE RELATIONAL TYPES

(71) Applicant: HRL Laboratories, LLC, Malibu, CA (US)

(72) Inventors: David A. Jurgens, Rome (IT); Tsai-Ching Lu, Wynnewood, PA (US)

(73) Assignee: HRL Laboratories, LLC, Malibu, CA (US)

( * ) Notice: Subject to any disclaimer, the term of this patent is extended or adjusted under 35 U.S.C. 154(b) by 460 days.

(21) Appl. No.: 14/207,205

(22) Filed: Mar. 12, 2014

Related U.S. Application Data

(60) Provisional application No. 61/778,984, filed on Mar. 13, 2013.

(51) Int. Cl.
*G06F 15/173* (2006.01)
*H04L 29/08* (2006.01)
*H04L 12/44* (2006.01)

(52) U.S. Cl.
CPC .......... *H04L 67/1061* (2013.01); *H04L 12/44* (2013.01)

(58) Field of Classification Search
CPC ..... H04L 12/44; H04L 12/46; H04L 12/4604; H04L 12/4608; H04L 12/4612;
(Continued)

(56) References Cited

U.S. PATENT DOCUMENTS

| | | | |
|---|---|---|---|
| 2009/0316699 A1* | 12/2009 | Mark | G06Q 30/02 370/392 |
| 2011/0097001 A1* | 4/2011 | Labbi | G06K 9/6219 382/225 |

(Continued)

OTHER PUBLICATIONS

Jinki Kim, Gwan-Su Yi, (2013), "RDOM: A Tool for Regulatory Motif Detection in Signaling Network," PLoS ONE, Jul. 2013, 8(7): e68407.

(Continued)

*Primary Examiner* — Dhairya A Patel
(74) *Attorney, Agent, or Firm* — Tope-McKay & Associates

(57) ABSTRACT

Described is a system for automated community discovery in networks with multiple relational types. The system receives a network as input. The network comprises neighbors, edges connecting the neighbors, and vertices, where edges between two vertices represent a relation. A set of pair-wise similarity comparisons is computed for all pairs of relations. Two relations are considered similar if vertices connected to the two relations share similar relations to the same set of neighbors. A relation dendrogram is created based on the set of pair-wise similarity comparisons. Then, a cut in the relation dendrogram is selected to compute a community solution, resulting in a plurality of relation dendrogram partitions. Each relation dendrogram partition represents a community. A community density criterion is computed based on a density of each community calculated with respect to edge types contained within each community. Finally, a community solution is generated that maximizes the community density criterion.

17 Claims, 11 Drawing Sheets

(58) Field of Classification Search
CPC .............. H04L 12/462; H04L 12/4633; H04L 12/4637; H04L 9/3265; H04L 2012/44; H04L 2012/445; H04L 2012/46
See application file for complete search history.

(56) References Cited

U.S. PATENT DOCUMENTS

| | | | | |
|---|---|---|---|---|
| 2011/0238493 | A1* | 9/2011 | Ghosh | G06Q 30/02 705/14.46 |
| 2012/0239797 | A1* | 9/2012 | Agrawal | H04L 41/12 709/224 |
| 2013/0254305 | A1* | 9/2013 | Cheng | H04L 51/32 709/206 |

OTHER PUBLICATIONS

Y. Ahn, J. Bagrow, and S. Lehmann, Link commmunities reveal multiscale complexity in networks, Nature vol. 486. No. 7307, pp. 761764, (2010).

Brian Ball, Brian Karrer, and M. E. J. Newman, An efficient and principled method for detecting communities in networks, Phys. Rev. E 84, 036103 (2011).

Santo Fortunate, Community detection in graphs, Physics Reports, vol. 466, Issues 3-5, pp. 75-174, (2010).

D. Greene and P. Cunningham, "Multi-view clustering for mining heterogeneous social network data," in Workshop on Information Retrieval over Social Networks, 31st European Conference on Information Retrieval (ECIR09), (2009).

R. Milo, S. Shen-Orr, S. Itzkovitz, N. Kashtan, D. Chklovskii, and U. Alon, "Network motifs: simple building blocks of complex networks," Science, vol. 298, No. 5594, p. 924. (2002).

P. Mucha, T Richardson, K Macon, M. Porter, and J. Onnela, "Community structure in time-dependent, multiscale, and multiplex networks," Science, vol. 328, No. 5980, p. 876, (2010).

Rodriguez M.A., Shinavier, J., Exposing Multi-Relational Networks to Single-Relational Network Analysis Algorithms, Journal of Informetrics, vol. 4, No. 1,pp. 29-41. ISSN: 1751-1577, Elsevier. doi:10.1016/j.joi.2009.06.004, LA-UR-08-03931, (Dec. 2009).

T. M. Selee, T. G. Kolda, W. P. Kegelmeyer, J. D. Griffin, "Extracting clusters from large datasets with multiple similarity measures," SRI Summer Proceedings 2007, Technical Report SAND2007-7977, Sandia National Laboratories, Albuquerque, NM and Livermore, CA, M. L. Parks, S. S. Collis, eds. (2007), p. 87.

M. Szell, R. Lambiotte, and S. Thurner, "Multirelational organization of large-scale social networks in an online world." Proceedings of the National Academy of Sciences, vol. 107, No. 31, p. 13636, (2010).

Jure Leskovec, Kevin J. Lang, Anirban Dasgupta, and Michael W. Mahoney, "Statistical Properties of Community Structure in Large Social and Information Networks." WWW (2008) Apr. 21-25, 2008, Beijing, China, ACM 978-1-60588-085-2/08/04 / Refereed Track: Social Networks & Web 2.0—Discovery and Evolution of Communities, pp. 695-704.

David Jurgens and Keith Stevens, "The S-Space Package: An Open Source Package forWord Space Models," Proceedings of the ACL (2010) System Demonstrations, pp. 30-35, Uppsala, Sweden, Jul. 13, 2010 Association for Computational Linguistics.

* cited by examiner

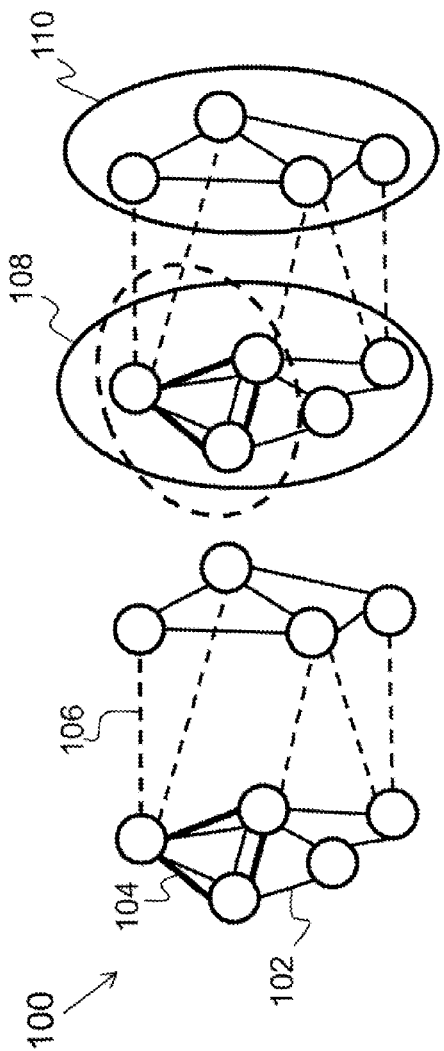
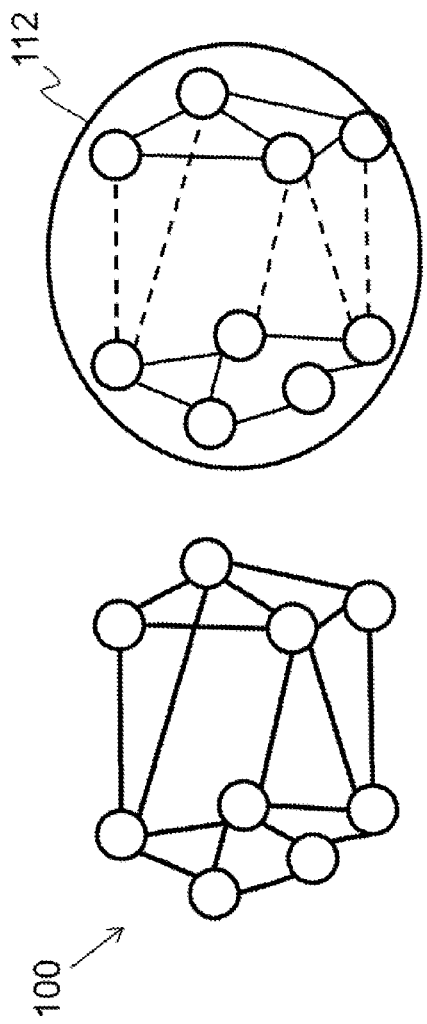
FIG. 1A
FIG. 1B
FIG. 1C
FIG. 1D

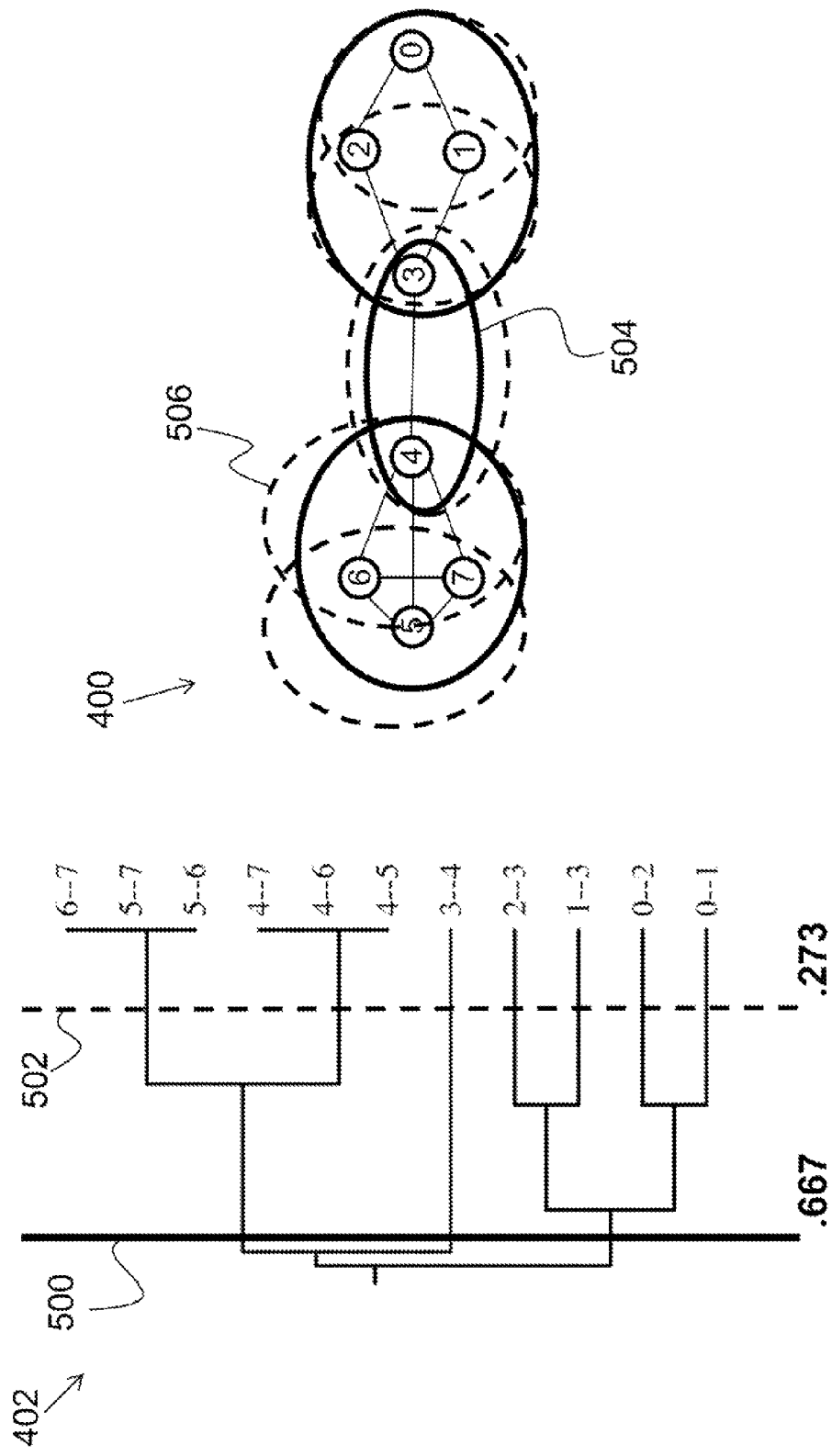

| 10 Largest Clusters |
|---|
| Australia, Belgium, Brazil, Bulgaria, Canada, Czechoslovakia, Denmark, Free_French_Forces, Free_Polish_Forces, Germany, Greece, India, Italian_Resistance, Italy, Jewish_Resistance, Luxembourg, Netherlands, New_Zealand, Norway, Panama, Poland, South_Africa, Soviet_Union, United_Kingdom |
| Australia, Belgium, Brazil, Canada, Czechoslovakia, Denmark, Free_French_Forces, Free_Polish_Forces, Greece, India, Italian_Resistance, Luxembourg, Netherlands, New_Zealand, Norway, Panama, Poland, South_Africa, Southern_Rhodesia, Soviet_Union, United_Kingdom, United_States |
| Bulgaria, Croatia, Finland, Germany, Hungary, Italy, Romania, Slovakia, Spain |
| Australia, Burma, Canada, India, Japan, Netherlands, Thailand, United_Kingdom, United_States |
| Australia, Canada, Free_French_Forces, South_Africa, Southern_Rhodesia, United_Kingdom, United_States, Vichy_France |
| Croatia, Finland, Hungary, Romania, Slovakia, Soviet_Union, Spain |
| Bulgaria, Germany, Hungary, Italy, Partisans, Romania, Yugoslavia |
| Australia, British_Hong_Kong, Canada, India, Malaysia, United_Kingdom |
| Fiji, New_Zealand, Tonga, United_Kingdom, United_States |
| British_East_Africa, British_Somaliland, India, Northern_Rhodesia, United_Kingdom |

SYSTEM AND METHODS FOR AUTOMATED COMMUNITY DISCOVERY IN NETWORKS WITH MULTIPLE RELATIONAL TYPES

CROSS-REFERENCE TO RELATED APPLICATIONS

This is a Non-Provisional patent application of U.S. Provisional Application No. 61/778,984, filed in the United States on Mar. 13, 2013, entitled, "System and Methods for Automated Community Discovery in Networks with Multiple Relational Types."

BACKGROUND OF THE INVENTION (1) Field of Invention

The present invention relates to a system for automatically identifying communities in networks and, more particularly, to a system for automatically identifying communities in networks based on relationships between connected vertices in the network.

(2) Description of Related Art

Community detection in networks has received significant attention in the previous decade, with hundreds of approaches being proposed (see the List of Cited Literature References, Literature Reference No. 3). Nearly all of these approaches operate on networks with undirected edges and no edge weights. While some methods have been proposed for directed, bipartite, or weighted networks, only recently has community detection been suggested for multigraphs, or multiplex networks.

Greene and Cunningham (see Literature Reference No. 4) proposed a method based on clustering the different modes of a multigraph separately and then combining them later to obtain the final community solution. Their framework is independent of the algorithm used to partition each mode of the network, with K-means being suggested as a first approximation. The clustering outputs of each mode are then unified through an ensemble method that uses agglomerative clustering over the community memberships. Because this method analyzes each network mode independently, it is unable to recognize regularities between modes, or higher-order relationships between the modes themselves. Furthermore, the method is unable to include information about the different modes and whether regularities between specific modes should be heavily weighted or ignored.

Mucha et al. (see Literature Reference No. 6) used Laplacian dynamics over a tensor to discover regularities in the different modes of a multigraph. Their tensor-based approach was generalized to time-dependent networks where each mode corresponds to a discrete time step, and to multiscale views of the same community. An analysis on a 3-mode social network showed how the Laplacian dynamics could be used to merge the independent community solutions. However, this method requires manual specification for a parameter that adjusts how the different modes are used. Furthermore, it cannot receive a priori information on the relationships between the different modes.

Selee et al. (see Literature Reference No. 8) proposed a tensor decomposition approach to community detection that clusters the decomposed structure of the tensor to identify communities. However, this approach does not supply a specific mechanism for discovering how many communities are present; it must be specified by the user. Furthermore, the scalability of the approach is limited by the high computational expense of the tensor decomposition.

Rodriguez and Shinavier (see Literature Reference No. 7) proposed a method for mapping multi-modal networks to single-mode networks so that community detection can be perform using existing algorithms. They use a network path-based algebra to decide which paths in the different modes should be present in the resulting single-mode network. This approach is unable to provide a complete community detection solution and requires that the resulting single-mode network discover communities that are consistent with the single-node projection of the multi-modal information.

Each of the prior methods described above exhibit limitations that make them incomplete. Thus, a continuing need exists for a system and method that enables community detection in multigraphs.

SUMMARY OF THE INVENTION

The present invention relates to a system for automatically identifying communities in networks based on relationships between connected vertices in the network. The system comprises one or more processors and a memory having instructions such that when the instructions are executed, the one or more processors perform multiple operations. A network comprising a plurality of neighbors, edges connecting the plurality of neighbors, and vertices is received as input to the system, where edges between two vertices represent a relation. A set of pair-wise similarity comparisons is computed for all pairs of relations. Two relations are similar if vertices connected to the two relations share similar relations to the same set of neighbors. A relation dendrogram is created based on the set of pair-wise similarity comparisons. Then, a cut in the relation dendrogram is selected to compute a community solution, resulting in a plurality of relation dendrogram partitions. Each relation dendrogram partition represents a community. A community density criterion is computed based on a density of each community calculated with respect to edge types contained within each community. Finally, a community solution is generated that maximizes the community density criterion.

In another aspect, similarity is defined to be proportional to a percentage of neighbors that are shared in common with respect to the similarity of edge types connecting the neighbors according to the following similarity function:

$$sim(r_{i,k}, r_{j,k}) = \frac{f(N_i, N_j)}{|N_i|^2 + |N_j|^2 - f(N_i, N_j)}$$

where $r_{i,k}$, $r_{j,k}$ represents two relations which share a vertex k and where $i \neq j$, N represents a neighbor, and $f(N_i, N_j)$ is defined as:

$$f(N_i, N_j) = \sum_{m \in N_i \cap N_j} \sum_{e_{i,m} \in E_{i,m}} \sum_{e_{j,m} \in E_{j,m}} \sigma(e_{i,m}, e_{j,m}),$$

where $\sigma(e_{i,m}, e_{j,m})$ is a similarity function over the edge types of edge $e_{i,m}$ and edge $e_{j,m}$, $\Sigma$ is a summation, and $E_{i,j}$ denotes a set of edge types connecting vertices i and j.

In another aspect, a total goodness of a community is measured as the sum of the community's density relative to a total number of edges in the network and weighted by an average community similarity.

In another aspect, communities within the network are evaluated through analysis of global organization of motifs in the network, wherein a modularity function is defined in terms of motif structure according to the following:

$$Q_M = \frac{1}{|M|} \sum_{C_i} \sum_{m_i^t \in C_i} f(m_i^t) - E[f(m_i^t)],$$

where M is the set of all motif instances in the network, and $f(m_i^t)$ denotes the frequency of a motif $m_i^t$ within community $C_i$, $\Sigma$ is a summation, and E represents an expect value; wherein a parameter $\pi$ is defined that captures total correlation between motifs in communities relative to their expected correlation according to the following:

$$\pi = \Sigma_{m_i^t, m_j^u \in M | t \neq u, i \neq j} |\rho(m_i^t, m_j^u) - E[\rho(m_i^t, m_j^u)]|,$$

where $\rho(m_i^t, m_j^u)$ is the correlation between the occurrences of the two motifs over all communities in the network.

In another aspect, the similarity of motifs in the network is evaluated, where $\sigma\rho(m_i^t, m_j^u)$ is a function over M that defines the similarity of any two motifs in the network, and wherein the similarity of an individual community C is defined as:

$$\tau(C) = \frac{1}{|M_C|} \sum_{m_i^t, m_j^u \in C} \sigma(m_i^t, m_j^u) \cdot (f(m_i^t) \cdot f(m_j^u)),$$

where $M_c$ is the set of motifs in C.

In another aspect, the network is evaluated based on global organization of motifs in the network and motif similarity according to the following:

$$Q = \frac{\pi}{|M|} \sum_{C_i} \tau(C_i) \cdot \sum_{m_i^t \in C_i} f(m_i^t) - E[f(m_i^t)].$$

In another aspect, the present invention also comprises a method for causing a processor to perform the operations described herein.

Finally, in yet another aspect, the present invention also comprises a computer program product comprising computer-readable instruction means stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 1A is an illustration of a network with relation edge types according to the principles of the present invention;

FIG. 1B is an illustration of community detection based on differences between relation edge types according to the principles of the present invention;

FIG. 1C is an illustration of a network without relation edge types;

FIG. 1D is an illustration of community detection that does not consider relation edge types;

FIG. 5A illustrates community detection in a network, where ovals represent detected communities according to the principles of the present invention;

FIG. 5B is a dendrogram corresponding to the network illustrated in FIG. 5A according to the principles of the present invention;

FIG. 8 is a table of communities found by the community discovery process according to the principles of the present invention;

DETAILED DESCRIPTION

Figure 2:
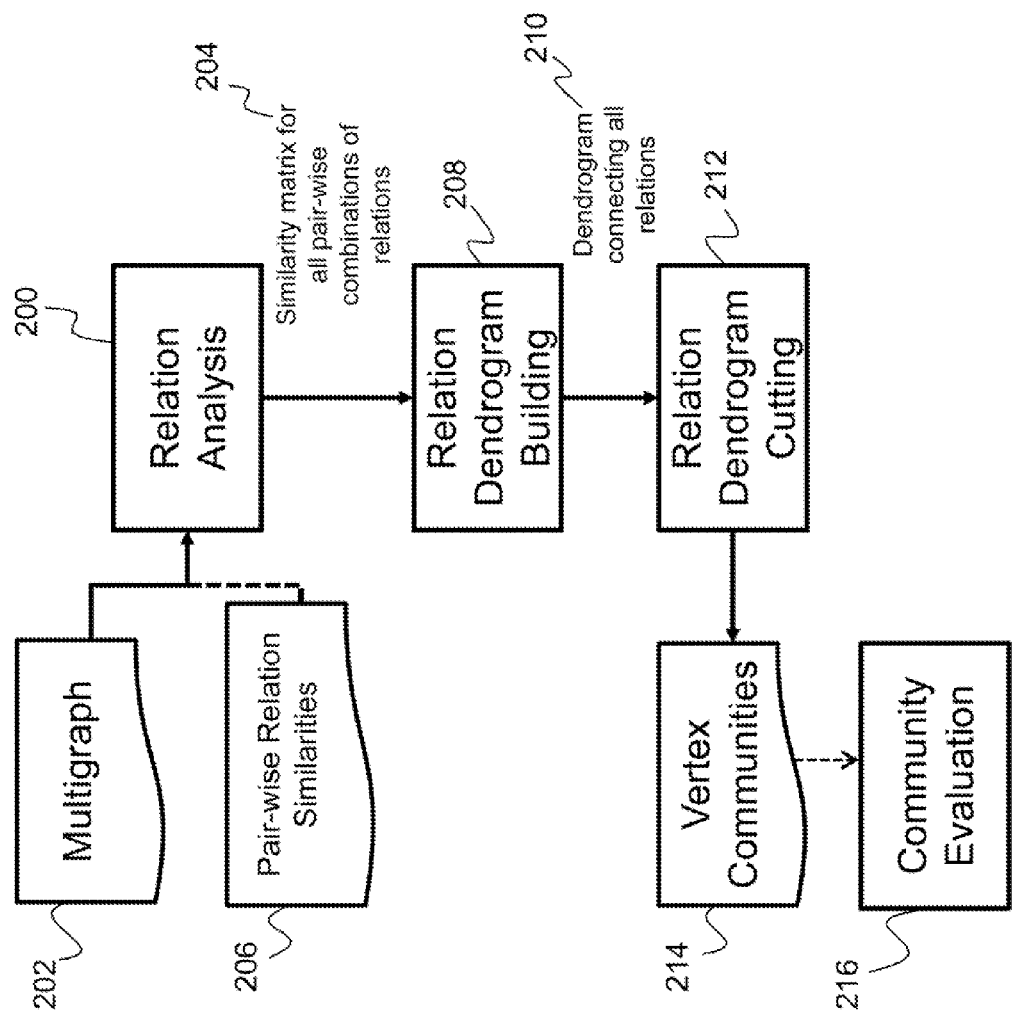
FIG. 2 is a flow diagram illustrating a method for automated community discovery in networks according to the principles of the present invention.

The present invention relates to a system for automatically identifying communities in networks and, more particularly, to a system for automatically identifying communities in networks based on relationships between connected vertices in the network. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Subsequently, an introduction provides the reader with a general understanding of the present invention. Finally, specific details of the present invention are provided to give an understanding of the specific aspects.

(1) List of Incorporated Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. Y. Ahn, J. Bagrow, and S. Lehmann, Link communities reveal multiscale complexity in networks, Nature, vol. 466, no. 7307, pp. 761764, 2010.
2. Brian Ball, Brian Karrer, and M. E. J. Newman, An efficient and principled method for detecting communities in networks, Phys. Rev. E 84, 036103 (2011).
3. Santo Fortunato, Community detection in graphs, Physics Reports, Volume 486, Issues 3-5, Pages 75-174, 2010.
4. D. Greene and P. Cunningham, "Multi-view clustering for mining heterogeneous social network data," in Workshop on Information Retrieval over Social Networks, 31st European Conference on Information Retrieval (ECIR09), 2009.
5. R. Milo, S. Shen-Orr, S. Itzkovitz, N. Kashtan, D. Chklovskii, and U. Alon, "Network motifs: simple building blocks of complex networks," Science, vol. 298, no. 5594, p. 824, 2002.
6. P. Mucha, T. Richardson, K. Macon, M. Porter, and J. Onnela, "Community structure in time-dependent, multiscale, and multiplex networks," Science, vol. 328, no. 5980, p. 876, 2010.
7. M. Rodriguez and J. Shinavier, "Exposing multi-relational networks to single-relational network analysis algorithms," Journal of Informetrics, vol. 4, no. 1, pp. 29-41, 2010.
8. T. M. Selee, T. G. Kolda, W. P. Kegelmeyer, J. D. Griffin, "Extracting clusters from large datasets with multiple similarity measures, "SRI Summer Proceedings 2007, Technical Report SAND2007-7977, Sandia National Laboratories, Albuquerque, N. Mex. and Livermore, Calif., M. L. Parks, S. S. Collis, eds. (2007), p. 87.
9. M. Szell, R. Lambiotte, and S. Thurner, "Multirelational organization of large-scale social networks in an online world," Proceedings of the National Academy of Sciences, vol. 107, no. 31, p. 13636, 2010.
10. A. Lancichinetti and S. Fortunato. "Community detection algorithms: A comparative analysis," Phys. Rev. E, 80:056117, November 2009.
11. T. Evans and R. Lambiotte, "Line graphs, link, partitions, and overlapping communities", Physical Review E, 80(1):016105, 2009.
12. M. Newman and M. Girvan, "Finding and evaluating community structure in networks," Physical review E, 69(2):026113, 2004.
13. Leskovec et al., "Statistical properties of community structure in large social and information networks," International World Wide Web Conference (WWW), 2008/Referred Track: Social Networks & Web 2.0—Discovery and Evolution of Communities, pp. 695-704.
14. Rogers and Tanimoto, "A computer program for classifying plants," Science 132 (3434): 1115-1118, 1960.
15. Jurgens and Stevens, "The S-space package: an open source package for word space models," Proceedings of the ACL 2010 System Demonstrations, pp. 30-35.
16. Arenas et al., "Motif-based communities in complex networks," J. Phys. A: Mathematical and Theoretical, 41 224001, doi:10.1088/1751-8113/41/22/224001.
17. Kim J, Yi G-S (2013) RMOD: A Tool for Regulatory Motif Detection in Signaling Network. PLoS ONE 8(7): e68407.

(2) Principal Aspects

The present invention has three "principal" aspects. The first is a system for automatically identifying communities in a network. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for automatically identifying communities in a network. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(3) Introduction

The present invention is a system and method for identifying communities in a multigraph (network) with rich relational structure, where two vertices may be related by one or more relationships. A community detection network identifies groups of vertices that are more connected together than not. These communities and their properties can be thought of as descriptive properties of the network itself (see Literature Reference Nos. 10 and 13). Traditionally, community detection methods have focused on networks where nodes are connected by a single edge, which is possibly weighted (see Literature Reference Nos. 3 and 10). However, many types of real-world networks are incorrectly modeled as unimodal. Indeed, only recently have community detection methods begun to acknowledge the potential for modeling these different relationship types. Treating these networks independent of their additional properties can lead to a significant loss of information regarding their community structure.

FIGS. 1A-1D illustrate the differences in community detection between faithfully treating a multimodal multigraph and simplifying it as a single-edge type graph. In the context of the present invention, "mode" refers to the number of relationship types that connect nodes. In a multimodal multigraph, two vertices may be connected by more than one edge (i.e., line), and edge "colors" carry semantic information about the type of relation between vertices, such as the difference between a friend and an enemy. A vertex is a point where two or more straight lines meet.

Although colored lines are not depicted, it should be understood that various indicators/symbols can be used provided that they clearly indicate "types" of nodes and edges. For the purposes of the present application, various line styles, such as solid lines, bold lines, and dashed lines, are used to depict the types of nodes and edges in the figures. Thus, while color may be used as a non-limiting example of an indicator in the description below, it should be understood that other indicator types are possible.

FIG. 1A shows a network 100 with friend edges 102 (represented by unbolded solid lines), family edges 104 (represented by bold solid lines), and enemy edges 106 (represented by dashed lines). FIG. 1B illustrates community detection according to the principles of the present invention, which takes into account the differences between edge types (i.e., friend edges 102 vs. enemy edges 106) and arrives at the correct partitioning into two groups 108 and 110, or communities. In contrast to the present invention, current methods view the connections (edges) between vertices as binary (i.e., either connected or not), as shown in FIG. 1C. This results in the entire network being considered a single community 112, as depicted in FIG. 1D.

According to the principles of the present invention, the problem of finding communities within systems is modeled as colored multigraphs. As addressed above, various line styles are used to represent the colored nodes and edges of the multigraphs within the figures. First, a new method for creating a global cover of a network using a color-based edge similarity method is defined. Then, the question of what makes a "good" community in these models is revisited, expanding the definition of cohesiveness and defining two additional properties, solidarity and affinity, which reflect structural properties of communities when richer network information is available. From these, the existing definition to a family of modularity functions is generalized. Together, a system and method that can automatically detect communities in multigraphs is provided by the present invention. Moreover, the invention described herein provides flexibility for users to provide their similarity function to experiment with subtle semantic relations for particular domains.

(4) Specific Details

The method for identifying communities according to the principles of the present invention uses both connectivity and similarity of relationship types. Recent methods have shown that edge-based analysis provides high-quality community solutions and, furthermore, allows discovering of overlapping communities (see Literature Reference Nos. 1, 2, and 11 for a description of the recent methods). Communities were derived on the basis of their relation similarity, which encompasses the multiple edges that may connect two vertices.

FIG. 2 is a flow diagram summarizing the method according to the principles of the present invention. All of the edges between two vertices in a multigraph are referred to as its relation. During relation analysis 200, a relation analyzer takes the multigraph 202 as input and outputs a similarity matrix for all pair-wise combinations of relations 204, which is a set of pair-wise similarity comparisons for any two pairs of relations. Optionally, the relation analyzer can also take pair-wise relation similarities 206 as input. In one aspect, the pair-wise relation similarities are user supplied. The relation dendrogram building step 208 takes as input the similarity matrix for all pair-wise combinations of relations 204 and creates a dendrogram that represents a hierarchy of relations based on similarity (dendrogram connecting all relations 210). The dendrogram is cut (relation dendrogram cutting 212) at a certain level and then analyzed to derive the final community solution, or vertex communities 214. In one aspect, the present invention can perform community evaluation 216 to analyze higher-order structures in the network, as represented by repeated network structures or motifs. Dashed arrows and lines indicate processes which are optional in the present invention (e.g., pair-wise relation similarities 206 and community evaluation 216). Each of these modules is described in further detail below.

(4.1) Relation Analysis

The relation analyzer takes the entire network as input and outputs the similarity matrix for all pair-wise combinations of relations 204. The relation analysis is based on the premise that two relations are similar if vertices connected to those relations share similar relations to the same set of neighbors. The similarity is defined to be proportional to the percentage of neighbors that are shared in common with respect to the similarity of the edge sets connecting the neighbors.

This is formalized as a similarity function for two relations $r_{i,k}$, $r_{j,k}$, which share vertex k and where i≠j. Let $N_v$ refer to the multiset of neighbors connected by all edges of a vertex v, and let $E_{i,j}$ refer to the set of colored edges connecting vertices i and j. The similarity of two connections is defined as:

$$sim(r_{i,k} r_{j,k}) = \frac{f(N_i, N_j)}{|N_i|^2 + |N_j|^2 - f(N_i, N_j)}$$

and $f(N_i, N_j)$ is defined as $$f(N_i, N_j) = \sum_{m \in N_i \cap N_j} \sum_{e_{i,m} \in E_{i,m}} \sum_{e_{j,m} \in E_{j,m}} \sigma(e_{i,m}, e_{j,m})$$

where $\sigma(e_{i,m}, e_{j,m})$ is a similarity function over the colors (i.e., type) of edge $e_{i,m}$ and edge $e_{j,m}$. The similarity for relations that do not share a vertex in common is 0. Note that "color" does not refer to red, blue, or green, but a characteristic of an edge. For instance, Literature Reference No. 17 uses color to represent different structural properties of a network.

The $\sigma(e_{i,m}, e_{j,m})$ function may be user supplied. Alternatively, by default it is defined as an identity function according to the following:

$$\sigma(e_{i,m}, e_{j,m}) = \begin{cases} 1 & \text{color}(e_{i,m}) = \text{color}(e_{j,m}) \\ 0 & \text{else} \end{cases}$$

In the default definition, the color similarity function simplifies to the Tanimoto similarity coefficient, which is a multiset generalization of the Jaccard Index that measures the overlap between sets. Literature Reference No. 14 provides a description of the color similarity function. The similarity function is maximized when i and j have identical neighbors and the edge to those neighbors have maximal similarity. Conversely, the similarity function is minimized when i and j have identical neighbors but those neighbors have negative similarity, which indicates that i and j have opposing relations to all their neighbors.

A user may also define the $\sigma(e_{i,m}, e_{j,m})$ according to a priori knowledge of the network's meaning. For example, in a social network, the user may opt to relate specific relations by setting their similarities to non-zero (e.g., a "sibling" and "parent" relation may be similar, while "co-worker" and "spouse" remain dissimilar). By adjusting the similarity of edge colors, the user can discover different community structures.

Figure 3:
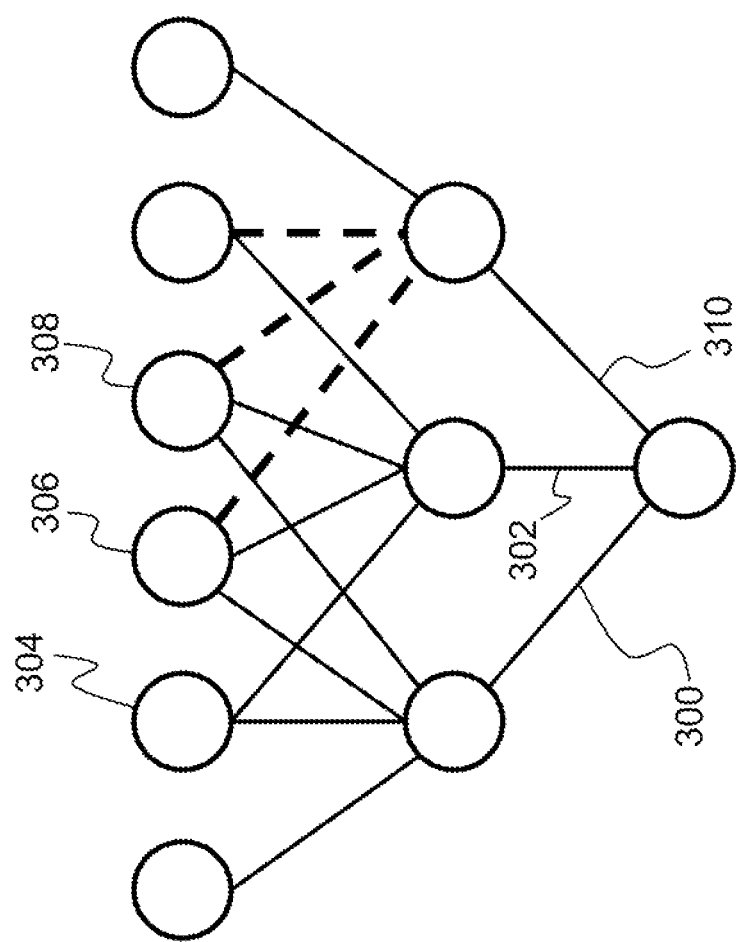
FIG. 3 is an illustration of a network depicting the premise that two relations are similar if vertices connected to those relations share similar relations to the same set of neighbors according to the principles of the present invention.

FIG. 3 illustrates the premise that two relations are similar if vertices connected to those relations share similar relations to the same set of neighbors. The similarity of two edges is determined both by their overlap in a neighboring network structure and the similarity of their relationships to that the structure. In FIG. 3, edge 300 and edge 302 are considered similar because they share common neighbors (nodes 304, 306, and 308) and have the same relation with them. In contrast, edges 302 and 310 share the same number of neighbors; however, they have different relationships (indicated by the edges having dashed lines), which potentially decreases the edge similarity based on the similarity of the relationship types.

(4.2) Building the Relation Dendrogram

The dendrogram building step takes as input the similarity values for all pair-wise combinations of relations, generated by the relation analyzer, and creates a dendrogram that represents a hierarchy of relations based on similarity. The method uses hierarchical agglomerative clustering with single-linkage criteria to merge clusters, which can be computed in $O(N^2)$ time with respect to the number of relations. $O(N^2)$ is the standard big O notation in computer science, which describes the limiting behavior of a function when the argument tends towards a particular value or infinity. Hierarchical agglomerative clustering with single-linkage criteria is described in Literature Reference No. 15. However, as can be appreciated by one skilled in the art, other clustering methods may be utilized, which allows further flexibility in the method.

Figure 4B:
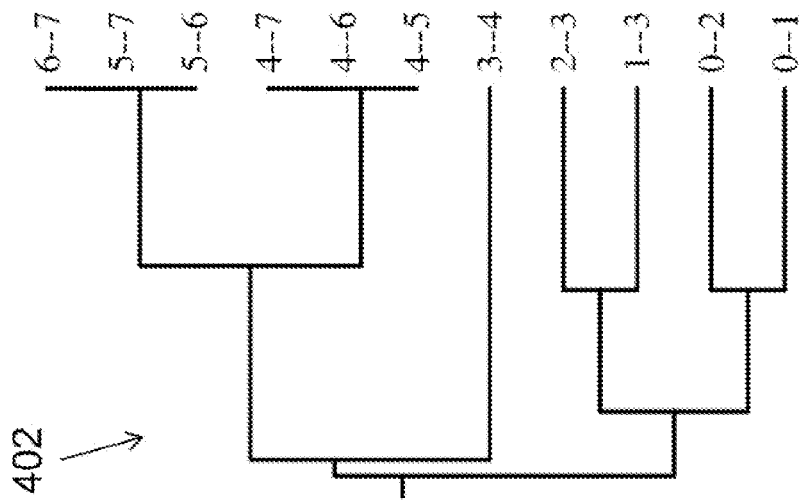
FIG. 4B is a dendrogram built from similarities of edges in the network graph in FIG. 4A, where the two edges with the highest similarities are merged in a cluster according to the principles of the present invention.
Figure 4A:
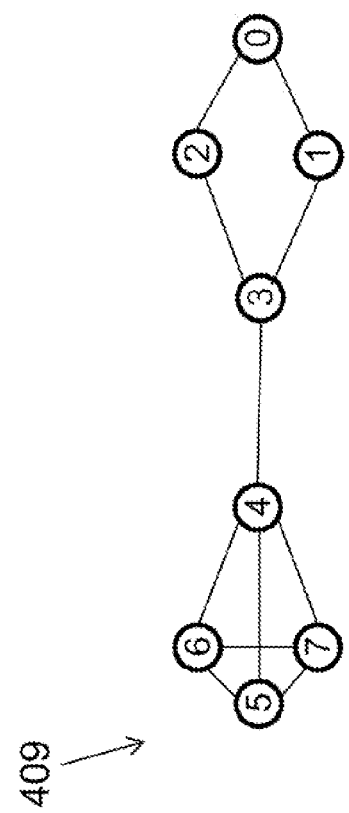
FIG. 4A is an illustration of a network graph according to the principles of the present invention.

FIGS. 4A and 4B illustrate how a dendrogram is created with similarity relations of a network. The similarities of edges in a graph 400 (FIG. 4A), which represents the network, are used to build a dendrogram 402 (FIG. 4B), where the two edges with the highest similarities are merged into a cluster. The merging continues by repeatedly finding the two edges with the highest similarity (that are also not the same cluster) and then merging their respective clusters 409.

(4.3) Selecting the Community Solution

The final community solution is decided by taking the dendrogram as input and then selecting a cut in the dendrogram that maximizes a community density criterion. The final clustering solution is derived from the resulting dendrogram partitions. The density criterion is designed to identify communities that maximize the number of edges between the vertices in the community, while simultaneously maximizing the average similarity of the edges in the community. This is formalized as follows. Let n be the number of vertices in a community and m be the number of edges between the members of that community. For a graph with c colors C, the maximum number of edges in a community is $c*(n(n+1)/2)$, while the minimum is $n-1$. The density of each community is then calculated as the number of edges in that community relative to the minimum and maximum possible:

$$\text{density}(C) = m \times \frac{(n-1)}{\frac{n(n-1)}{2}(n-1)},$$

where density=0 if n=2. C refers to a color, and c denotes a count of the number of colors C. In the optimal community solution, each community maximizes the number of edges within itself, while minimizing the number of edges between. Furthermore, the edges within a community should also be similar with each other. The similarity of the edges $\{e_1, \ldots, e_m\}$ in community C is defined as:

$$sim(C) = \frac{m(m+1)}{2} \sum_{e_i e_j \in C | i \neq j} \sigma(e_i, e_j).$$

Therefore, the total goodness of the community solution with k communities is measured as the sum of each community's density relative to the total number of edges in the network and weighted by the average community similarity:

$$\frac{1}{kM} \sum_{i=1}^{k} \text{density}(C_i) + sim(C_i).$$

By weighting the density according the clustering similarity, this equation penalizes structurally consistent communities that have dissimilar edge colors connecting their vertices. Finally, the community solution that maximizes a community density criterion is obtained. The final clustering solution is derived from the resulting dendrogram partitions.

FIG. 5A shows how the dendrogram 402 of FIG. 4B is cut (as depicted by the vertical lines 500 and 502 crossing the dendrogram 402) to derive the community solution shown in FIG. 5B. The dendrogram 402 may be cut at different levels to compute a specific community solution. The heuristic of the present invention computes the density of the resulting communities with respect to the edge types contained within. The dendrogram 402 is cut at two different places, giving the optimal cut (0.667 density) at vertical (solid) line 500 and suboptimal cut (0.273) at vertical (dashed) line 502, with the resulting communities depicted as ovals, each surrounding a group of nodes in the graph 400 in FIG. 5B. Specifically, communities created by the optimal cut are surrounded by solid ovals, such as a community represented by reference element 504. Communities created by the suboptimal cut are surrounded by dashed ovals, such as a community represented by reference element 506.

Figure 6:
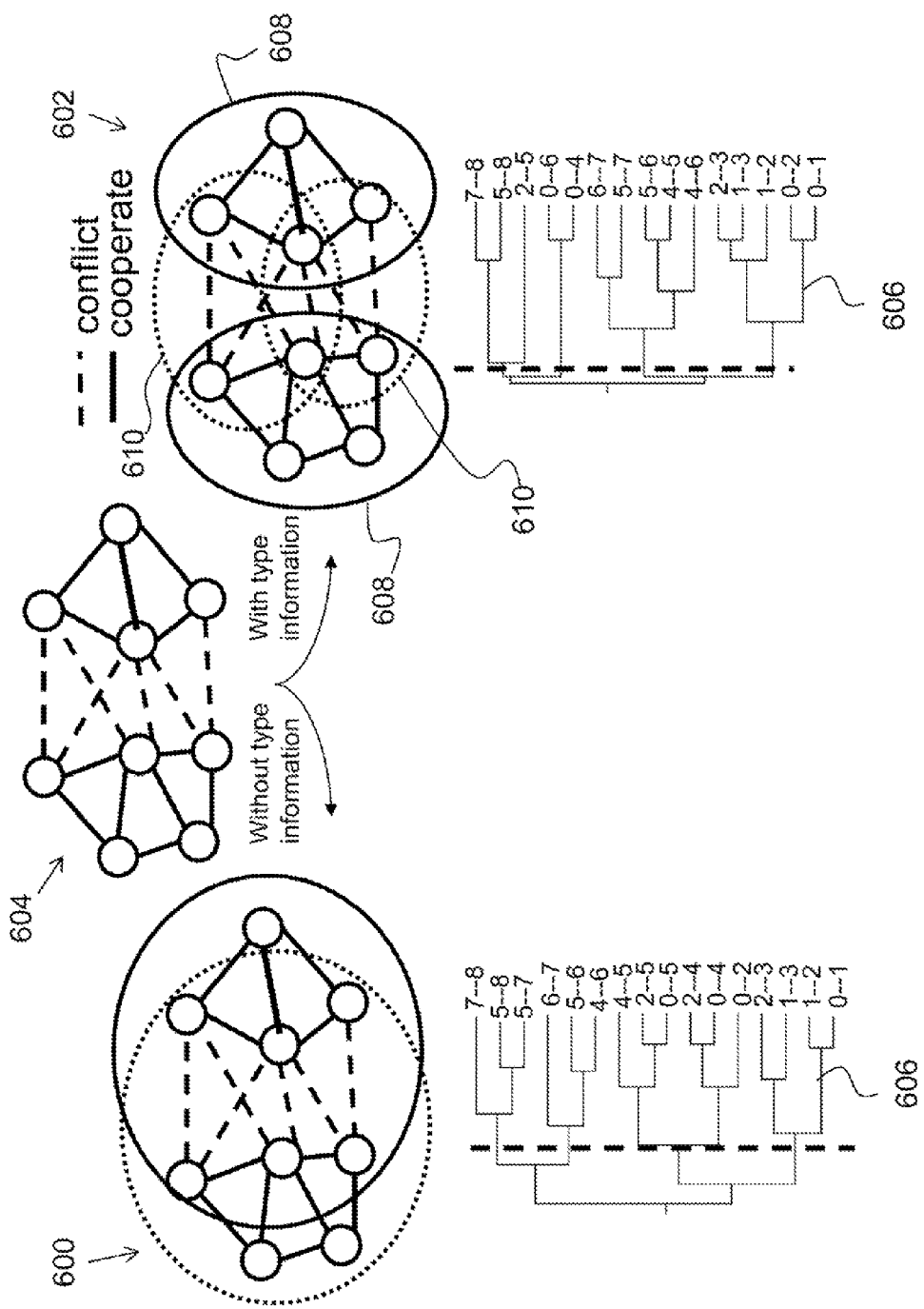
FIG. 6 is an illustration contrasting the differences between using and not using edge type information in finding communities according to the principles of the present invention.

FIG. 6 is an illustration of two contrasting community solutions 600 and 602 on a graph 604 with cooperation and conflict, which use edge types (community solution 602) and no edge types (community solution 600). In the graph 604, solid lines (i.e., edges) represent cooperating individuals, while dashed lines (i.e., edges) between nodes represent conflicting individuals. By using edge type information on where to cut the corresponding dendrogram 606, communities of cooperating individuals emerge (depicted as nodes surrounded by solid ovals 608). Furthermore, communities of conflicting individuals (depicted as nodes surrounded by dashed ovals 610) are also detected. Without edge type information, the distinctions between cooperative and conflicting groups are lost, as shown in community solution 600, where cooperating individuals are grouped with conflicting individuals.

(4.4) Evaluating the Communities

A multimodal network offers significant opportunities for analyzing higher-order structures in the network, as represented by repeated network structures or motifs. For instance, social networks exhibit multimodal motif structures due to different social relationships: coworkers, friends, and relatives are linked in different configurations according to external social constraints. In the present invention, another type of community detection that identifies network covers that reflect the higher order structure present within them is described. Traditionally, community detection methods have used modularity (see Literature Reference No. 12) to evaluate the goodness of their algorithm, where for a network, G, partitioned into clusters $C=c_1, \ldots, c_n$, the modularity is defined as:

$$Q = \sum_{c=1}^{n_c} \left[ \frac{l_c}{m} - \left( \frac{d_c}{2m} \right)^2 \right],$$

where m is the number of edges in the graph, $l_c$ is the number of edges in cluster $c_i$, $d_c$ is the sum of the degrees for the nodes in $c_i$, and $n_c$ is the number of communities. While this modularity definition has been extended to define modularity for directed and weighted networks, which is described in Literature Reference No. 16, currently little research has examined the role of higher-order structure in modularity.

The present invention defines a new modularity for evaluating multimodal networks based on the properties of (1) global organization of higher-order structure within and between communities, and (2) operator-supplied semantics on the network modes themselves. Higher-order structure is defined in terms of motifs, which are repeated patterns in the network and have been found to correspond to meaningful building-blocks from which networks are constructed, as described in Literature Reference No. 5.

In the present invention, the original modularity function was redefined in terms of motif structure:

$$Q_M = \frac{1}{|M|} \sum_{C_i} \sum_{m_i^t \in C_i} f(m_i^t) - E[f(m_i^t)],$$

where M is the set of all motifs instances in G, E denotes an expected value of the entity within the brackets, and $f(m_i^t)$ denotes the frequency of the motif $m_i^t$ occurring within community $C_i$. Note that if a motif is defined as an edge of any color, this definition is equivalent to the original modularity.

To account for the first property of a global organization of structure, a new parameter i was defined that captures the total correlation between motifs in communities relative to their expected correlation. A community solution that exhibits strong correlation between motifs relative to the null model indicates that motifs appearing together are related. For example, in a social network with edge colors defined according to social relationships (i.e., parent, sibling, co-worker, friend, etc.), one would expect to find correlations between motifs that appear in the same social setting (e.g., a parent-child-sibling motif correlated with a parent-spouse-child motif). Accordingly, π is formally defined as:

$$\pi = \Sigma_{m_i^t, m_j^u \in M | t \neq u, i \neq j} | \rho(m_i^t, m_j^u) - E[\rho(m_i^t, m_j^u)] |,$$

where $\rho(m_i^t, m_j^u)$ is the correlation between the occurrences of the two motifs over all communities.

For the second property, one can evaluate whether the motifs that are present within a community are similar to each other based on user-supplied semantics. Let $\sigma(m_i^t, m_j^u)$ be a function over the space of M that defines the similarity of any two motifs. One can then define the similarity of an individual community C as:

$$\tau(C) = \frac{1}{|M_c|} \sum_{m_i^t, m_j^u \in C} \sigma(m_i^t, m_j^u) \cdot (f(m_i^t) \cdot f(m_j^u)),$$

where $M_c$ is the set of motifs in C. The resulting function is maximized when the most frequently occurring motifs in the C are maximally similar.

The final modularity that incorporates both properties of a global organization and of intra-community motif similarity is defined as:

$$Q = \frac{\pi}{|M|} \sum_{C_i} \tau(C_i) \cdot \sum_{m_i^t \in C_i} f(m_i^t) - E[f(m_i^t)].$$

Figure 7B:
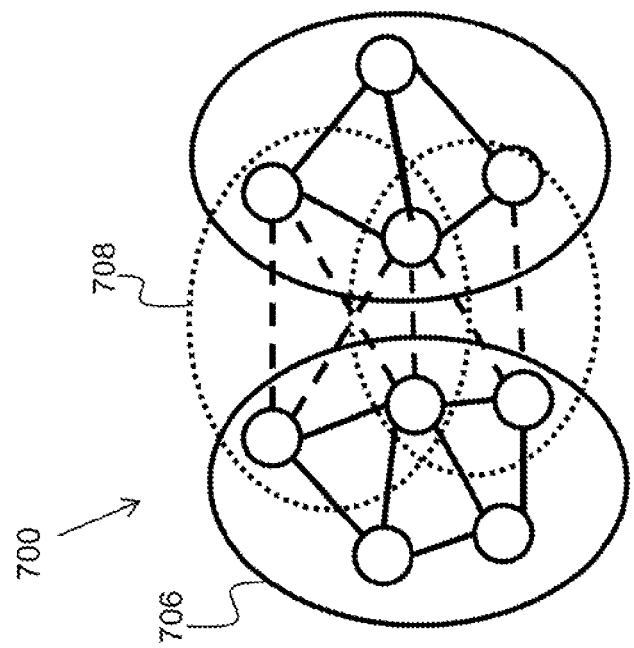
FIG. 7B illustrates communities detected in the network illustrated in FIG. 7A according to the principles of the present invention.
Figure 7A:
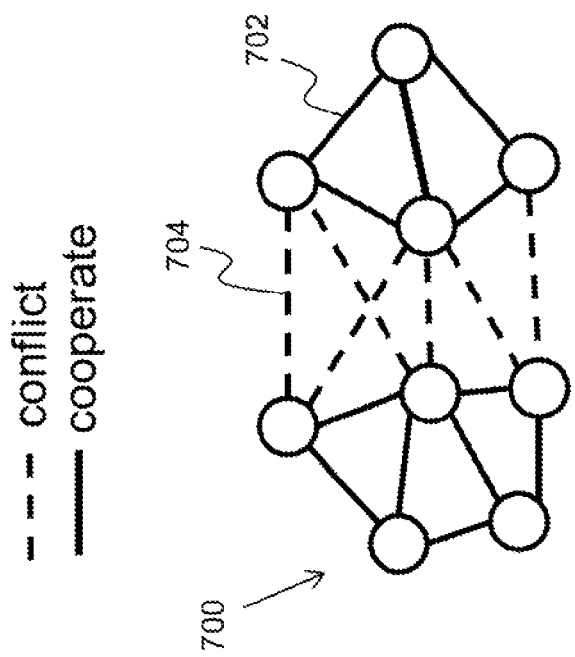
FIG. 7A illustrates a network with cooperating and conflicting edge types according to the principles of the present invention.
Figure 7C:
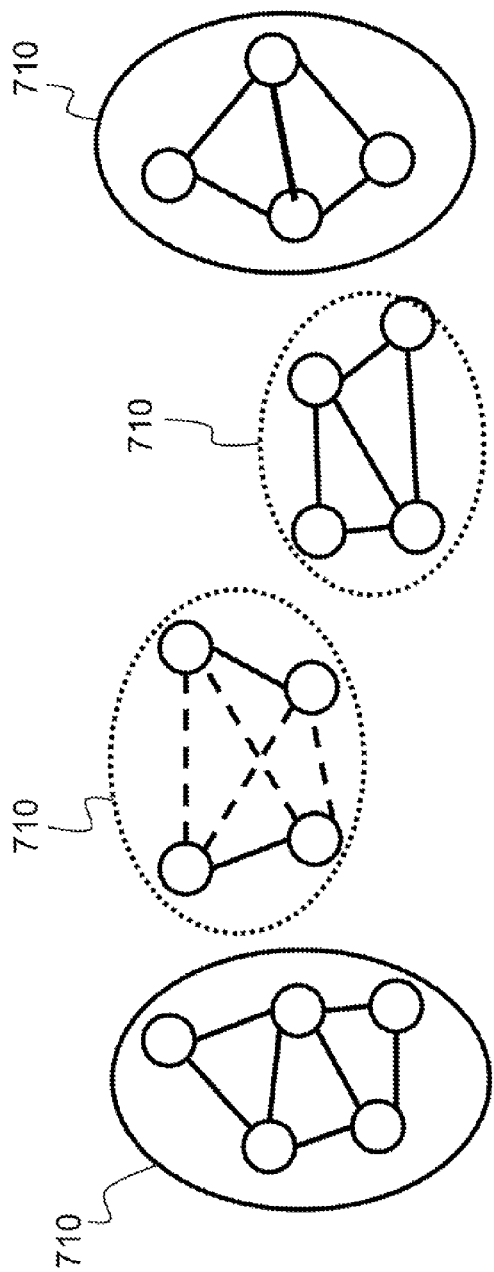
FIG. 7C illustrates each community detected in FIG. 7B displaying a regular structure having repeated instances of motifs according to the principles of the present invention.
Figure 7D:
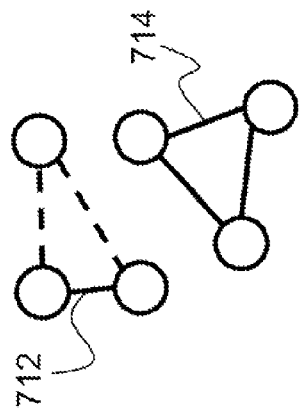
FIG. 7D illustrates motifs detected in the communities illustrated in FIG. 7C according to the principles of the present invention.

FIG. 7A illustrates a network 700 (or graph) with cooperation and conflict, where solid lines 702 represent cooperating individuals, and dashed lines 704 represent conflicting individuals. As shown in FIG. 7B, the network 700 is partitioned to discover communities (where a solid oval 706 represents a cooperating community and a dashed oval 708 represents a conflicting community), which is then evaluated using a motif-based modularity. Each community 710 is highlighted individually in FIG. 7C. Each community displays a regular structure having repeated instances of the motif structures 712 and 714 shown in FIG. 7D. The modularity definition of the present invention takes the motif structures into account when measuring the goodness of a solution, which is in contrast to existing solutions that use only the number of edges within the community relative to the edges outgoing from the community.

(4.5) Experimental Results

In an experimental test of the present invention, all military engagements during World War II were coded into a multigraph with two edge types. Countries that cooperated with each other during an engagement were linked by a "cooperative" edge, while countries that opposed each other in the engagement were linked with an "aggressive" edge. The resulting graph accounted for 61 countries and 290 links between them. Furthermore, the cooperative nature of the Allies and Axis powers created a strong clustering property for the graph, with an average clustering coefficient of 0.681 and an average path length of 2. FIG. 8 is a table 800 listing the communities discovered by the present invention with relational types. The resulting communities found by the community discover process according to the principles of the present invention contain both major groups of cooperating Ally and Axis powers (communities in rows 2, 3, 9, 10), as well as communities corresponding to major theaters of war where different groups of countries engaged in battle. Thus, it is shown that the present invention effectively automatically identifies communities in networks on the basis of the vertices' relationships with each other.

Figure 9:
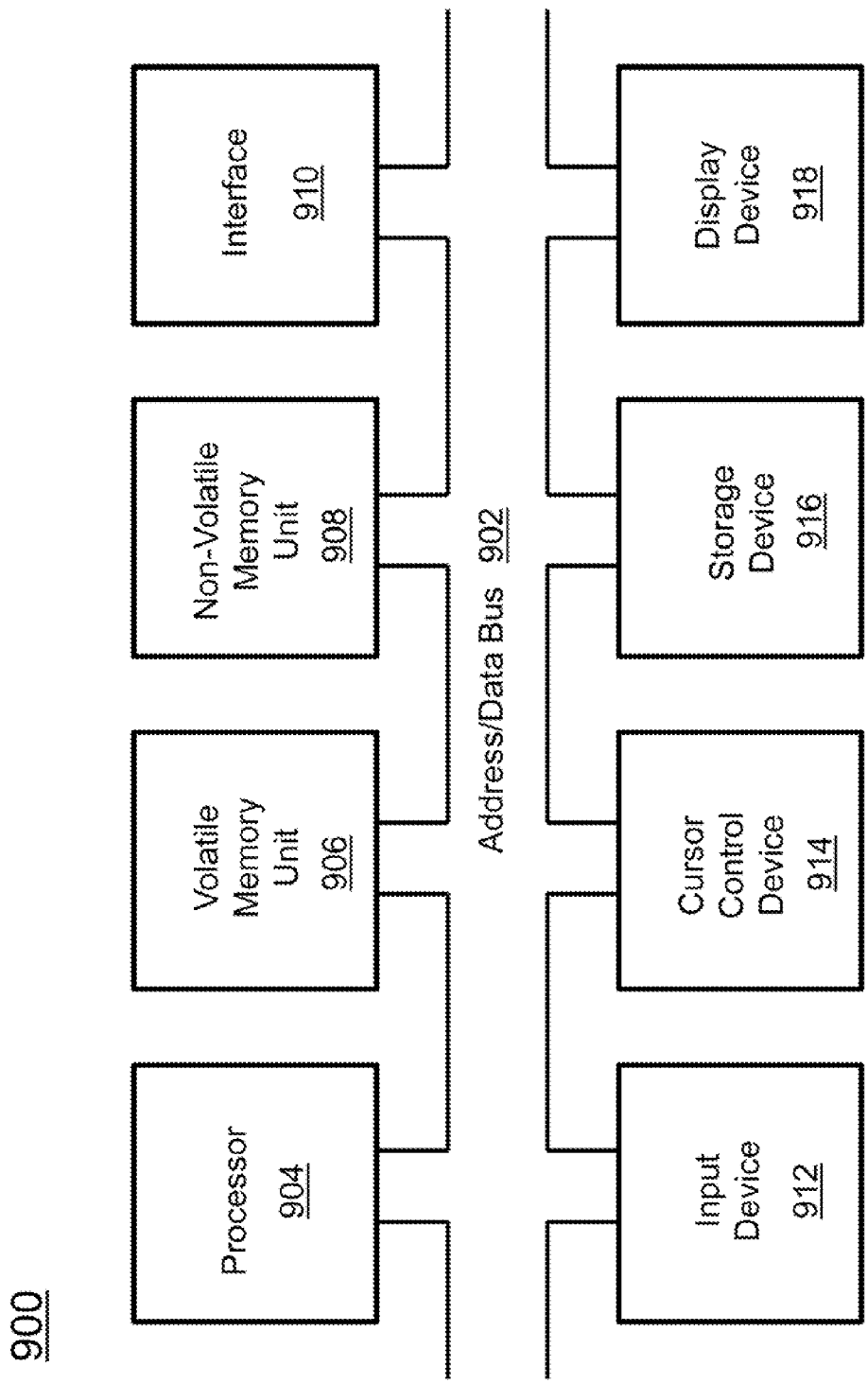
FIG. 9 is an illustration of a data processing system according to the principles of the present invention.

An example of a computer system 900 in accordance with one aspect is shown in FIG. 9. The computer system 900 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 900. When executed, the instructions cause the computer system 900 to perform specific actions and exhibit specific behavior, such as described herein.

The computer system 900 may include an address/data bus 902 that is configured to communicate information. Additionally, one or more data processing units, such as a processor 604, are coupled with the address/data bus 902. The processor 904 is configured to process information and instructions. In one aspect, the processor 904 is a microprocessor. Alternatively, the processor 904 may be a different type of processor such as a parallel processor, or a field programmable gate array.

The computer system 900 is configured to utilize one or more data storage units. The computer system 900 may include a volatile memory unit 906 (e.g., random access memory ("RAM"), static RAM, dynamic RAM, etc.) coupled with the address/data bus 902, wherein a volatile memory unit 906 is configured to store information and instructions for the processor 904. The computer system 900 further may include a non-volatile memory unit 908 (e.g., read-only memory ("ROM"), programmable ROM ("PROM"), erasable programmable ROM ("EPROM"), electrically erasable programmable ROM "EEPROM"), flash memory, etc.) coupled with the address/data bus 902, wherein the non-volatile memory unit 908 is configured to store static information and instructions for the processor 904. Alternatively, the computer system 900 may execute instructions retrieved from an online data storage unit such as in "Cloud" computing. In an embodiment, the computer system 900 also may include one or more interfaces, such as an interface 910, coupled with the address/data bus 902. The one or more interfaces are configured to enable the computer system 900 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 900 may include an input device 912 coupled with the address/data bus 902, wherein the input device 912 is configured to communicate information and command selections to the processor 900. In accordance with one aspect, the input device 912 is an alphanumeric input device, such as a keyboard, that may include alphanumeric and/or function keys. Alternatively, the input device 912 may be an input device other than an alphanumeric input device. In one aspect, the computer system 900 may include a cursor control device 914 coupled with the address/data bus 902, wherein the cursor control device 914 is configured to communicate user input information and/or command selections to the processor 900. In one aspect, the cursor control device 914 is implemented using a device such as a mouse, a track-ball, a track-pad, an optical tracking device, or a touch screen. The foregoing notwithstanding, in one aspect, the cursor control device 914 is directed and/or activated via input from the input device 912, such as in response to the use of special keys and key sequence commands associated with the input device 912. In an alternative aspect, the cursor control device 914 is configured to be directed or guided by voice commands.

In one aspect, the computer system 900 further may include one or more optional computer usable data storage devices, such as a storage device 916, coupled with the address/data bus 902. The storage device 916 is configured to store information and/or computer executable instructions. In one aspect, the storage device 916 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 618 is coupled with the address/data bus 902, wherein the display device 918 is configured to display video and/or graphics. In one aspect, the display device 918 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 900 presented herein is an example computing environment in accordance with one aspect. However, the non-limiting example of the computer system 900 is not strictly limited to being a computer system. For example, one aspect provides that the computer system 900 represents a type of data processing analysis that may be used in accordance with various aspects described herein. Moreover, other computing systems may also be implemented. Indeed, the spirit and scope of the present technology is not limited to any single data processing environment. Thus, in one aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, one aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 10:
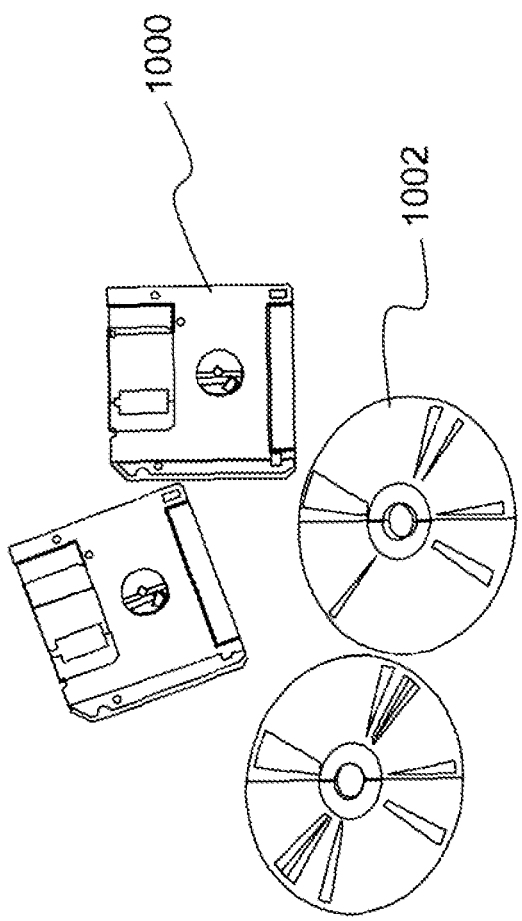
FIG. 10 is an illustration of a computer program product according to the principles of the present invention.

An illustrative diagram of a computer program product embodying the present invention is depicted in FIG. 10. As a non-limiting example, the computer program product is depicted as either a floppy disk 1000 or an optical disk 1002. However, as mentioned previously, the computer program product generally represents computer readable code (i.e., instruction means or instructions) stored on any compatible non-transitory computer readable medium.

What is claimed is:

1. A system for automated community discovery in networks with multiple relational types, the system comprising:
one or more processors and a non-transitory computer-readable medium having executable instructions encoded thereon such that when executed, the one or more processors perform operations of:
receiving as input a network comprising a plurality of neighbors, edges connecting the plurality of neighbors, and vertices, wherein edges between two vertices represent a relation;
computing a set of pair-wise similarity comparisons for all pairs of relations, wherein two relations are similar if vertices connected to the two relations share similar relations to the same set of neighbors,
wherein similarity is defined to be proportional to a percentage of neighbors that are shared in common with respect to the similarity of edge types connecting the neighbors;
creating a relation dendrogram based on the set of pair-wise similarity comparisons;
selecting a cut in the relation dendrogram to compute a community solution, resulting in a plurality of relation dendrogram partitions, each relation dendrogram partition representing a community;
computing a community density criterion based on a density of each community calculated with respect to edge types contained within each community; and
generating a community solution that maximizes the community density criterion,
wherein similarity is defined according to the following similarity function:

$$sim(r_{i,k} r_{j,k}) = \frac{f(N_i, N_j)}{|N_i|^2 + |N_j|^2 - f(N_i, N_j)}$$

where $r_{i,k}$, $r_{j,k}$ represents two relations which share a vertex k and where i≠j, N represents a neighbor, and $f(N_i, N_j)$ is defined as:

$$f(N_i, N_j) = \sum_{m \in N_i \cap N_j} \sum_{e_{i,m} \in E_{i,m}} \sum_{e_{j,m} \in E_{j,m}} \sigma(e_{i,m}, e_{j,m}),$$

where $\sigma(e_{i,m}, e_{j,m})$ is a similarity function over the edge types of edge $e_{i,m}$ and edge $e_{j,m}$, $\Sigma$ is a summation, and $E_{i,j}$ denotes a set of edge types connecting vertices i and j.

2. The system as set forth in claim 1, wherein the one or more processors further perform an operation of measuring a total goodness of a community as the sum of the community's density relative to a total number of edges in the network and weighted by an average community similarity.

3. The system as set forth in claim 2, wherein the one or more processors further perform an operation of evaluating communities within the network through analysis of global organization of motifs in the network, wherein a modularity function is defined in terms of motif structure according to the following:

$$Q_M = \frac{1}{|M|} \sum_{C_i} \sum_{m_i^t \in C_i} f(m_i^t) - E[f(m_i^t)],$$

where M is the set of all motif instances in the network, and $f(m_i^t)$ denotes the frequency of a motif $m_i^t$ within community $C_i$, $\Sigma$ is a summation, and E represents an expected value; wherein a parameter $\pi$ is defined that captures total correlation between motifs in communities relative to their expected correlation according to the following:

$$\pi = \Sigma_{m_i^t, m_j^u \in M | t \neq u, i \neq j} |\rho(m_i^t, m_j^u) - E[\rho(m_i^t, m_j^u)]|,$$

where $\rho(m_i^t, m_j^u)$ is the correlation between the occurrences of the two motifs over all communities in the network.

4. The system as set forth in claim 3, wherein the one or more processors further perform an operation of evaluating similarity of motifs in the network, where $\sigma(m_i^t, m_j^u)$ is a function over M that defines the similarity of any two motifs in the network, and wherein the similarity of an individual community C is defined as:

$$\tau(C) = \frac{1}{|M_C|} \sum_{m_i^t, m_j^u \in C} \sigma(m_i^t, m_j^u) \cdot (f(m_i^t) \cdot f(m_j^u)),$$

where $M_c$ is the set of motifs in C.

5. The system as set forth in claim 4, wherein the one or more processors further perform an operation of evaluating the network based on global organization of motifs in the network and motif similarity according to the following:

$$Q = \frac{\pi}{|M|} \sum_{C_i} \tau(C_i) \cdot \sum_{m_i^t \in C_i} f(m_i^t) - E[f(m_i^t)].$$

6. The system as set forth in claim 1, wherein similarity is defined using a product of a similarity function over edge types.

7. The system as set forth in claim 1, wherein similarity is maximized when a pair of vertices have identical neighbors.

8. A computer-implemented method for automated community discovery in networks with multiple relational types, comprising:

an act of causing a data processor to execute instructions stored on a non-transitory memory such that upon execution, the data processor performs operations of:

receiving as input a network comprising a plurality of neighbors, edges connecting the plurality of neighbors, and vertices, wherein edges between two vertices represent a relation;

computing a set of pair-wise similarity comparisons for all pairs of relations, wherein two relations are similar if vertices connected to the two relations share similar relations to the same set of neighbors, wherein similarity is defined to be proportional to a percentage of neighbors that are shared in common with respect to the similarity of edge types connecting the neighbors;

creating a relation dendrogram based on the set of pair-wise similarity comparisons;

selecting a cut in the relation dendrogram to compute a community solution, resulting in a plurality of relation dendrogram partitions, each relation dendrogram partition representing a community;

computing a community density criterion based on a density of each community calculated with respect to edge types contained within each community; and generating a community solution that maximizes the community density criterion, wherein similarity is defined according to the following similarity function:

$$sim(r_{i,k} r_{j,k}) = \frac{f(N_i, N_j)}{|N_i|^2 + |N_j|^2 - f(N_i, N_j)}$$

where $r_{i,k} \, r_{j,k}$ represents two relations which share a vertex k and where $i \neq j$, N represents a neighbor, and $f(N_i, N_j)$ is defined as:

$$f(N_i, N_j) = \sum_{m \in N_i \cap N_j} \sum_{e_{i,m} \in E_{i,m}} \sum_{e_{j,m} \in E_{j,m}} \sigma(e_{i,m}, e_{j,m}),$$

where $\sigma(e_{i,m}, e_{j,m})$ is a similarity function over the edge types of edge $e_{i,m}$ and edge $e_{j,m}$, $\Sigma$ is a summation, and $E_{i,j}$ denotes a set of edge types connecting vertices i and j.

9. The method as set forth in claim 8, wherein the data processor further performs an operation of measuring a total goodness of a community as the sum of the community's density relative to a total number of edges in the network and weighted by an average community similarity.

10. The method as set forth in claim 9, wherein the data processor further performs an operation of evaluating communities within the network through analysis of global organization of motifs in the network, wherein a modularity function is defined in terms of motif structure according to the following:

$$Q_M = \frac{1}{|M|} \sum_{C_i} \sum_{m_i^t \in C_i} f(m_i^t) - E[f(m_i^t)],$$

where M is the set of all motif instances in the network, and $f(m_i^t)$ denotes the frequency of a motif $m_i^t$ within community $C_i$, $\Sigma$ is a summation, and E represents an expected value; wherein a parameter a is defined that captures total corre-lation between motifs in communities relative to their expected correlation according to the following:

$$\pi = \Sigma_{m_i^t, m_j^u \in M | t \neq u, i \neq j} |\rho(m_i^t, m_j^u) - E[\rho(m_i^t, m_j^u)]|,$$

where $\rho(m_i^t, m_j^u)$ is the correlation between the occurrences of the two motifs over all communities in the network.

11. The method as set forth in claim 10, wherein the data processor further performs an operation of evaluating similarity of motifs in the network, where $\sigma(m_i^t, m_j^u)$ is a function over M that defines the similarity of any two motifs in the network, and wherein the similarity of an individual community C is defined as:

$$\tau(C) = \frac{1}{|M_C|} \sum_{m_i^t, m_j^u \in C} \sigma(m_i^t, m_j^u) \cdot (f(m_i^t) \cdot f(m_j^u)),$$

where $M_c$ is the set of motifs in C.

12. The method as set forth in claim 11, wherein the data processor further performs an operation of evaluating the network based on global organization of motifs in the network and motif similarity according to the following:

$$Q = \frac{\pi}{|M|} \sum_{C_i} \tau(C_i) \cdot \sum_{m_i^t \in C_i} f(m_i^t) - E[f(m_i^t)].$$

13. A computer program product for automated community discovery in networks with multiple relational types, the computer program product comprising computer-readable instructions stored on a non-transitory computer-readable medium that are executable by a computer having a processor for causing the processor to perform operations of:

receiving as input a network comprising a plurality of neighbors, edges connecting the plurality of neighbors, and vertices, wherein edges between two vertices represent a relation;

computing a set of pair-wise similarity comparisons for all pairs of relations, wherein two relations are similar if vertices connected to the two relations share similar relations to the same set of neighbors, wherein similarity is defined to be proportional to a percentage of neighbors that are shared in common with respect to the similarity of edge types connecting the neighbors;

creating a relation dendrogram based on the set of pair-wise similarity comparisons;

selecting a cut in the relation dendrogram to compute a community solution, resulting in a plurality of relation dendrogram partitions, each relation dendrogram partition representing a community;

computing a community density criterion based on a density of each community calculated with respect to edge types contained within each community; and generating a community solution that maximizes the community density criterion, wherein similarity is defined according to the following similarity function:

$$sim(r_{i,k} r_{j,k}) = \frac{f(N_i, N_j)}{|N_i|^2 + |N_j|^2 - f(N_i, N_j)}$$

where $r_{i,k}$ $r_{j,k}$ represents two relations which share a vertex k and where i≠j, N represents a neighbor, and $f(N_i, N_j)$ is defined as:

$$f(N_i, N_j) = \sum_{m \in N_i \cap N_j} \sum_{e_{i,m} \in E_{i,m}} \sum_{e_{j,m} \in E_{j,m}} \sigma(e_{i,m}, e_{j,m}),$$

where $\sigma(e_{i,m}, e_{j,m})$ is a similarity function over the edge types of edge $e_{i,m}$ and edge $e_{j,m}$, $\Sigma$ is a summation, and $E_{i,j}$ denotes a set of edge types connecting vertices i and j.

14. The computer program product as set forth in claim 13, further comprising instructions for causing the processor to perform an operation of measuring a total goodness of a community as the sum of the community's density relative to a total number of edges in the network and weighted by an average community similarity.

15. The computer program product as set forth in claim 14, further comprising instructions for causing the processor to perform an operation of evaluating communities within the network through analysis of global organization of motifs in the network, wherein a modularity function is defined in terms of motif structure according to the following:

$$Q_M = \frac{1}{|M|} \sum_{C_i} \sum_{m_i^t \in C_i} f(m_i^t) - E[f(m_i^t)],$$

where M is the set of all motif instances in the network, and $f(m_i^t)$ denotes the frequency of a motif $m_i^t$ within community $C_i$, $\Sigma$ is a summation, and E represents an expected value;

wherein a parameter π is defined that captures total correlation between motifs in communities relative to their expected correlation according to the following:

$$\pi = \Sigma_{m_i^t, m_j^u \in M | t \neq u, i \neq j} |\rho(m_i^t, m_j^u) - E[\rho(m_i^t, m_j^u)]|,$$

where $\rho(m_i^t, m_j^u)$ is the correlation between the occurrences of the two motifs over all communities in the network.

16. The computer program product as set forth in claim 15, further comprising instructions for causing the processor to perform an operation of evaluating similarity of motifs in the network, where $\alpha(m_i^t, m_j^u)$ is a function over M that defines the similarity of any two motifs in the network, and wherein the similarity of an individual community C is defined as:

$$\tau(C) = \frac{1}{|M_C|} \sum_{m_i^t, m_j^u \in C} \sigma(m_i^t, m_j^u) \cdot (f(m_i^t) \cdot f(m_j^u)),$$

where $M_c$ is the set of motifs in C.

17. The computer program product as set forth in claim 16, further comprising instructions for causing the processor to perform an operation of evaluating the network based on global organization of motifs in the network and motif similarity according to the following:

$$Q = \frac{\pi}{|M|} \sum_{C_i} \tau(C_i) \cdot \sum_{m_i^t \in C_i} f(m_i^t) - E[f(m_i^t)].$$

* * * * *